United States Patent
Arnold et al.

(10) Patent No.: US 7,374,102 B2
(45) Date of Patent: May 20, 2008

(54) RADIOFREQUENCY ANTENNAE AND IDENTIFICATION TAGS AND METHODS OF MANUFACTURING RADIOFREQUENCY ANTENNAE AND RADIOFREQUENCY IDENTIFICATION TAGS

(75) Inventors: Rocky R. Arnold, San Carlos, CA (US); Fabrizio Montauti, Pleasanton, CA (US); John C. Zarganis, Redwood City, CA (US); Gregory S. Beeck, San Jose, CA (US)

(73) Assignee: WaveZero, Inc., Sunnyvale, CA (US)

( * ) Notice: Subject to any disclaimer, the term of this patent is extended or adjusted under 35 U.S.C. 154(b) by 3 days.

(21) Appl. No.: 11/127,364

(22) Filed: May 11, 2005

(65) Prior Publication Data

US 2006/0017571 A1 Jan. 26, 2006

Related U.S. Application Data

(60) Provisional application No. 60/571,018, filed on May 14, 2004, provisional application No. 60/578,979, filed on Jun. 12, 2004, provisional application No. 60/588,927, filed on Jul. 16, 2004.

(51) Int. Cl.
*G06K 19/06* (2006.01)
(52) U.S. Cl. ................................ 235/492; 235/487

(58) Field of Classification Search ............... 235/492; 343/720
See application file for complete search history.

(56) References Cited

U.S. PATENT DOCUMENTS

| | | | | |
|---|---|---|---|---|
| 5,497,140 A | * | 3/1996 | Tuttle | 340/10.1 |
| 6,222,497 B1 | * | 4/2001 | Hu et al. | 343/846 |
| 6,432,739 B1 | * | 8/2002 | Gudesen et al. | 438/99 |
| 6,478,229 B1 | * | 11/2002 | Epstein | 235/492 |

* cited by examiner

*Primary Examiner*—Lisa Caputo
(74) *Attorney, Agent, or Firm*—Townsend and Townsend and Crew LLP

(57) ABSTRACT

The present invention includes improved RFID antennae and tags and methods of manufacturing the RFID antennas. The RFID tags of the present invention include a substrate that comprises an antenna assembly. A radiofrequency integrated circuit is in electrical communication with a portion of the antenna assembly. The RFID tag may include a structure, such as a lid element, that clamps and/or compresses the radiofrequency integrated circuit into contact with the antenna assembly, without the need for a conductive adhesive. In some embodiments, the antenna assembly is vacuum metallized or otherwise applied onto the substrate through patterned openings in a mask, such as a patterned masking cliché or a patterned polymer layer.

28 Claims, 7 Drawing Sheets

A-A

RADIOFREQUENCY ANTENNAE AND IDENTIFICATION TAGS AND METHODS OF MANUFACTURING RADIOFREQUENCY ANTENNAE AND RADIOFREQUENCY IDENTIFICATION TAGS

CROSS-REFERENCES TO RELATED APPLICATIONS

The present application claims benefit to U.S. Provisional Application Ser. No. 60/571,018, filed May 14, 2004, entitled "Method and Devices for Manufacturing RFID Tag Antennas," U.S. Provisional Patent Application Ser. No. 60/578,979, filed Jun. 12, 2004, entitled "Antenna Sub-assemblies for Radio Frequency Identifications RFID," and U.S. Provisional Patent Application Ser. No. 60/588,927, filed Jul. 16, 2004, entitled "Environmentally Protected RFID Tags," the complete disclosures of which are incorporated herein by reference.

BACKGROUND OF THE INVENTION

The present invention relates generally to radio frequency identification (RFID) antennas and tags, and methods of manufacturing RFID antennas and tags. More specifically, the present invention is directed toward vacuum metallized antennas for RFID tags and enclosures for protecting an integrated circuit of the RFID tag.

RFID tags are currently used to track and monitor inventory locations and communicate information and data about the product, substance, or person, they are attached to such as part number, descriptions, lot codes and other pertinent product information similar to information currently contained within a standard universal product (UPC) bar code. However, UPC bar code technology is an optical technology and is limited to line of site orientation. This limitation requires that the bar code reader which scans the bar code must be able to visually see the bar code label applied to the product in order to scan and read/record information. The advantage RFID tags have over bar code is that RFID technology is radio frequency based and does not require any visual line of site between the product ID tag and the reader or scanner. This allows the RFID tag and the reader to exchange information freely, regardless of the orientation of the ID tag, as long as the tag is within the readers scanning range. RFID tags can be read through packaging, containers, or through other products. In addition, RFID readers can read and identify any RFID tag that is within its scanning range all at once, without having to scan each individual item as is currently required with UPC bar codes. For example, while shopping in a grocery store, if all items were to have individual RFID tags, theoretically, the shopper would be able to simply walk through a scanner in a check out line and all items in their cart would be scanned and the customer charged accordingly without having to remove a single item from their cart. Other advantages for RFID tags would be for use with inventory management, automatic reordering when inventory levels fall below a set level, or security alerts for when items are removed from a particular location without authorization.

RFID is based upon using radio frequency (RF) signals to communicate information between small (generally less 25 mm to 300 mm on the largest side) RF receiver/transmitter devices and other electronic equipment used for "reading" the information contained in the memory circuitry of the small electronic device (the RFID tag). RFID tags are used to track and monitor the location of objects located in inventory and communicate information such as part number, descriptions, lot codes and other pertinent product information similar to information currently contained within a standard universal product (UPC) bar code. Additional electronic equipment (a.k.a., "reader") is used to both detect and collect information from the RFID tag. Typically, the reader will poll the RFID tag by sending an RF signal containing short instructions that ask the RFID tag to respond. The RFID tag, using either its own energy or the energy contained in the polling RF signal, to respond to the reader with the requested information. In current practice, an RFID device is placed onto a carrier medium, which is subsequently adhered to the object to be tracked.

While the possibilities for using RFID tags are ever increasing, the manufacturing costs for generating these RFID tags has to be addressed. The cost for manufacturing the tags has currently limited the use of RFID tags to pallets of products or to high dollar items such as compact discs, DVD's, or to high theft items such as Gillette razor blades where the cost of the tags are justifiable. This particular invention pertains to various methods and devices for manufacturing low cost RFID tags suitable for use on inexpensive everyday items.

RFID tags generally include a small passive integrated circuit chip attached to a thin polymer substrate that has been screened (similar to silk-screening) with a metal layer, the metal layer comprising an antenna sub-assembly. The RFID tag may be completed with an overlay of thin polymer film (or in some cases nothing is provided) as a means of providing minimal protection from the environment. As can be appreciated, the RFID tag is subject to mechanical abuse and or tampering and is exposed to environmental conditions that may impede the longer term performance of the RFID tag.

An important aspect of the antenna sub-assembly is the quality of the metal conductive layer in terms of electrical performance, as measured by antenna gain. Presently, a number of different methods may be used to accomplish a metalized shape on a substrate. For instance, a copper cladded foil can be etched to reveal an antenna shape. This process requires that a film material be first metalized completely, a mask applied (in the form of a deposition of another material in a prescribed shape, and subsequent etching to remove unwanted material. This process has the obvious cost disadvantages; however, the resulting metal layer (typically several micrometers of copper) provides adequate performance and reasonable adhesion to the film, albeit at a relatively high cost.

Film materials can be metalized using both conductive ink and conductive paint; however, the disadvantages of conductive paint (tendency to crack, environmental issues, need for relatively high conductive particle loading to achieve low resistance, etc.) dictate against its use for RFID tag sub-assemblies. Conductive ink can readily be applied to film materials to provide the required conductivity and performance. While the conductive particles are still suspended in a carrier matrix, the overall performance is adequate and the primary cost driver is the conductive ink. Conductive ink layers are on the order of tens of micrometers thick, though thinner depositions may be possible.

While the conventional methods of manufacturing RFID tags have proven adequate, as the need for these tags increases, there are concerns that the metal screening process will be limited in its cost reduction potential. The current estimated need for RFID tags is in the billions of tags per year and growing to perhaps trillions of tags per year with continued cost reductions. Consequently, what are needed are methods and RFID tags that may be manufactured cheaply and when necessary provide for a robust construction sufficient to be withstand the environment.

BRIEF SUMMARY OF THE INVENTION

The present invention provides antennas and methods for manufacturing the antennas. In particular, the present invention provides RFID antennas and RFID tags and methods of manufacturing the RFID tags.

The antenna assembly of the present invention may be vacuum metallized or otherwise applied onto the substrate through patterned openings in a mask, such as a patterned masking cliché or a patterned polymer layer. In one embodiment, the method of fabricating an antenna assembly or a portion thereof comprises providing a substrate and placing a mask over a first surface of the substrate. A conductive material is deposited (e.g., vacuum metallized) onto the substrate through the mask to form an antenna pattern on the substrate.

The RFID tags of the present invention include a substrate that comprises an antenna assembly. A radiofrequency integrated circuit is placed in electrical communication with a portion of the antenna assembly. The RFID tag may include a structure, such as a lid element, that clamps and/or compresses the radiofrequency integrated circuit into contact with the antenna assembly.

Other aspects, objects and advantages of the invention will be apparent from the detailed description that follows.

DETAILED DESCRIPTION OF THE INVENTION

Figure 1:
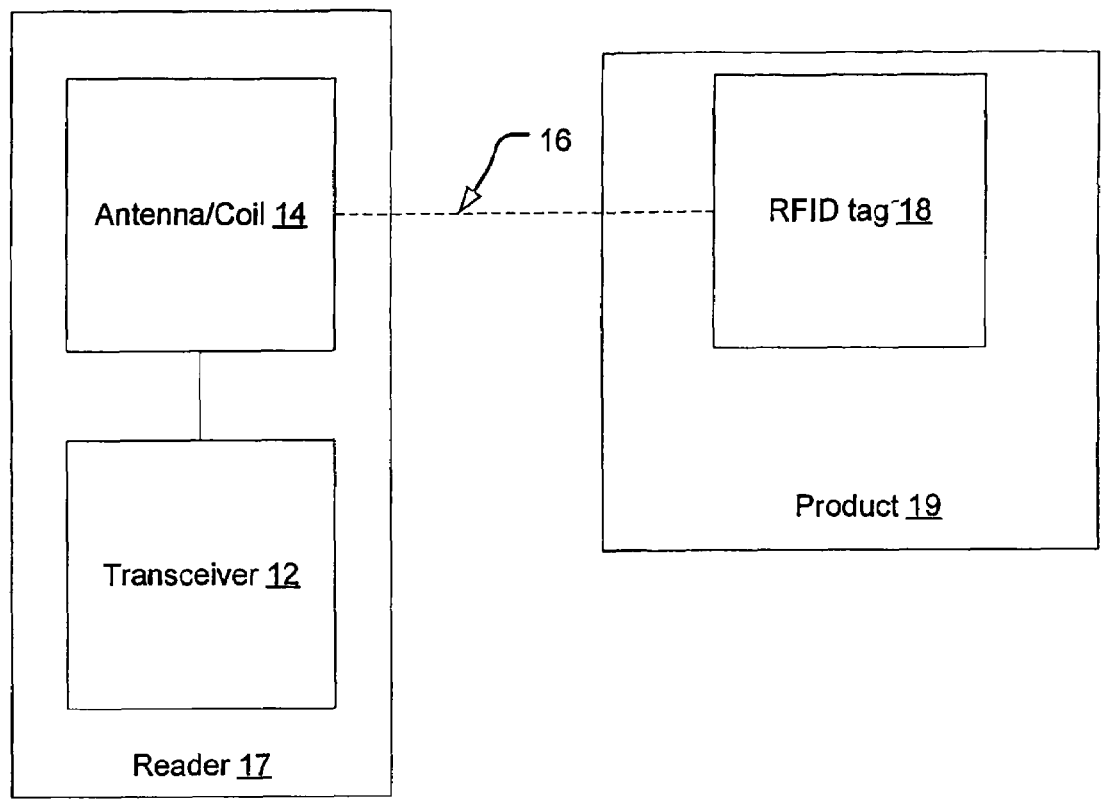
FIG. 1 schematically illustrates a simplified RFID system.

FIG. 1 schematically illustrates a simplified RFID system 10 encompassed by the present invention. The RFID system 10 includes a transceiver 12 coupled to an antenna or coil 14. The transceiver 12 and antenna 14 may be coupled together to form a radar or interrogator 17 that may a handheld or fixed device. The antenna 14 is configured to emit radiofrequency signals 16. When an RFID transponder (hereinafter referred to as "RFID tag 18") which is attached to a body 19 passes through an area in which the radiofrequency signals 16 are present or when the radiofrequency signals 16 are scanned over the RFID tag 18, the radiofrequency signals 16 activate (and power) the RFID tag 18. The RFID tag 18 reads an activation signal from the reader 17 and thereafter, the reader 17 decodes data encoded in an integrated circuit on the RFID tag 18 and the data is passed to the transceiver 12 for processing.

The RFID tags 18 of the present invention may come in a variety of different sizes and shapes and may operate in any number of different frequency ranges. The RFID tags 18 of the present invention may be of virtually any frequency however for practical reasons related to wavelength they will typically be in the tens of megahertz (13.56 MHz, for instance) to higher frequencies (2.4 GHz, for instance). In some embodiments, it may be possible to have the RFID tag be functional in a variety of different frequency ranges. Furthermore, the RFID tags 18 may be passive (e.g., no on-board power source/battery) or active (e.g., with an on-board power source). RFID tags 18 of the present invention typically include low cost transponders that offer multi-read capabilities that allow for read/write electronic storage. The RFID tags 18 may provide a variety of data transfer rates, that depend on the specific device and carrier frequency used. The RFID tags 18 encompassed by the present invention include close proximity tags (inductive systems) and RFID tags that are scannable from 100 feet or more (radiating systems). Depending on the type of transponders and interrogation hardware, the RFID tags 18 of the present invention typically do not need a line-of-sight for interrogation.

While the remaining discussion focuses on passive, substantially "flat" RFID tags 18, it should be appreciated that the present invention are applicable to a variety of different RFID tags including active tags. For example, the RFID tags may be implantable underneath the skin (e.g., human and animal tags) and may be screw-shaped, cylindrical, credit card shaped, rectangular, circular, spherical, or the like. One advantage of the present invention lies in the ability to either wrap the antenna into a shape (such as taking an initially flat tag and wrapping it into a small cylinder that could be placed under the skin) or formed either before or after the conductive antenna assembly is applied to form an alternate structure (such that the RFID tag would subsequently form and be conformal to another surface or object).

Figure 2:
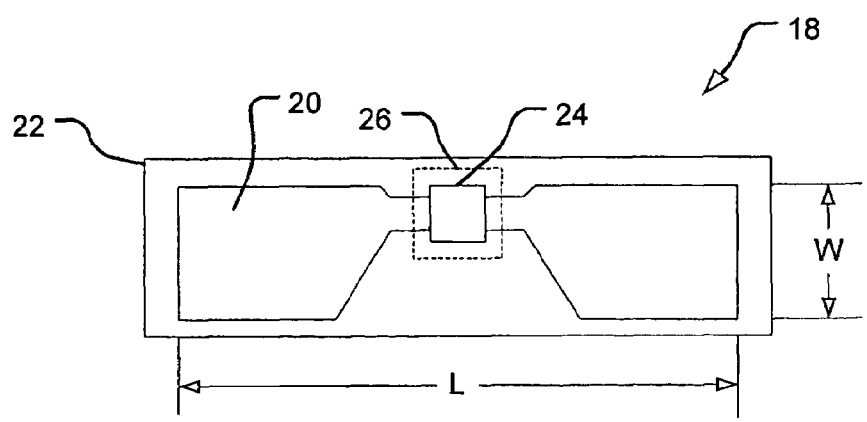
FIG. 2 illustrates one embodiment of an RFID tag that is encompassed by the present invention.

FIG. 2 illustrates one exemplary passive RFID tag 18 that is encompassed by the present invention. The RFID tag 18 comprises an antenna assembly 20 disposed on a substrate 22. Contacts (not shown) of one or more radiofrequency integrated circuits (RFIC) 24 may be placed into electrical communication with a selected contacts of antenna assembly 20. The combination of the antenna assembly 20 and an appropriate RFIC 24 will allow for receiving the radiofrequency signals 16 from the reader 17. While current day RFICs are relatively simple and offer only modest capabilities for data storage, retention, and processing, future RFICs may be entirely capable of extended processing and data storage. For example, potentially sophisticated communication systems (e.g., WiFi) could be simulated or created by a suitable network of RFID tags. The RFIC's 24 of the present invention may be configured to detect high frequency information content (data) by resolving the differences between one or more impinging electromagnetic signals. Such an RFIC 24 may act as a high frequency filter to permit (with suitable supporting circuitry) the highest frequency content to be resolved by differencing one or more carrier signals. For ease of reference, other elements of RFID tag 18, such as additional integrated circuits that are in communication with RFIC 24 and/or antenna assembly 20 are not shown, but it should be appreciated that such elements may be on RFID tag 18 of the present invention.

Substrate 22 of the present invention may be comprised of a variety of different dielectric materials, but is typically made of one or more layers of polymer (e.g., polyethylene, polycarbonate, PVC, PET, PETG, ABS, PC/ABS, or the like), thick resinous material such as silicon, paper, rubber, ceramics, or the like. The substrate 22 may be pre-cut into its desired shape or the substrate may be a roll or sheet of material that may be processed after the antenna assembly is formed thereon. The substrate is typically a substantially planar sheet that typically has a thickness between about ½ mil and about 30 mils, and preferably between about 2 mils and about 5 mils.

However, as noted above, substrate 22 may take a variety of different other shapes. The substrate may be formed either before application of the metal antenna shape or after. For instance, an initially flat RFID antenna tag may be "rolled" into a cylinder and placed into a mobile communications device to enable wither short-range communications (e.g., less than several meters) or act as the primary antenna for communication with a base station located substantially further (e.g., several kilometers). The ability of the RFID antenna tag to function properly depends on design, power, and software considerations which are virtually infinitely tailorable.

Antenna assembly 20 will be sized and shaped to receive and transmit information over a specific frequency or frequency range in order to communicate with the antenna 14 (FIG. 1). Antenna assembly 20 is typically made of a conductive material and may include any combination of aluminum, gold, silver, copper, tin, nickel, their alloys, or the like including highly conductive nano-conductive materials. Antenna assembly is preferably made of 100% solid metal and is typically in a pattern of interconnected lines that are configured to receive and transmit across a specific radiofrequency range. A design of antenna assembly strongly affects the efficiency, range, and power requirements of the reader and RFID tag electronics. Often, the design of the antenna assembly is influenced by the properties of the antenna coating material and the thickness and shape of the pattern of lines.

Antenna sensitivity is affected by the characteristics of the conductive material used to form the antenna pattern. From an environmental perspective, the choice of antenna material also affects the recyclability and the ability of the final antenna assembly to pass international standards for the use of hazardous materials. For instance, electroplated copper provides a relatively dense coating but presents environmental issues. Electroplating other materials such as nickel, silver, chrome, etc. presents similar issues as these materials are often considered heavy metals (e.g., they have a negative or detrimental interaction with the human body).

Vacuum metallization with aluminum, however, provides a final product using an element (aluminum) that has few if any toxic or negative reactions with the human body or environment. And, while the relative conductivity of aluminum is only about 60% of copper, it can be deposited by various vapor deposition techniques to provide a suitable thickness and conductivity to serve as an effective antenna.

Constructing an appropriate antenna design is driven by various factors including available power (either transmitted to a passive antenna or from battery sources), trace width, trace length, and trace design. Designers often trade off these factors in an attempt to achieve the best overall gain. Improving gain, in turn, allows a given design to either transmit/receive at greater range or transmit more data with less error. Antenna designs of the present invention can be as simple as a relatively large virtually square or rectangular area where the aspect ratio (in a planar sense) is on the order of one or they can be very long and circuitous where the aspect ratio is very large (say over a 100). Each shape results in a different radiated pattern of energy often with "lobes" of maximum and minimum intensity. In some situations, an antenna design with a dramatically enlarged lobe would be appropriate for highly directional communications, preferred in some applications. For more omni-directional situations (where radiated energy is rather uniform in angular position from the tag), it is useful to minimize the appearance of lobes through suitable antenna design. The present invention may be used to manufacture of such antenna designs.

Typically, the pattern of lines of the antennas will have a thickness of a few micrometers, but other patterns and line thicknesses are also possible. In other embodiments, however, the antenna assembly including the RFIC may be made of a conductive polymer (e.g., organic electronics) or a conductively filled dielectric material.

In one envisioned configuration, the antenna assembly has a width W of about 0.5 inches and a length of about 3.0 inches. Of course, as various needs for the RFID tags develop, and as the RFID tags are miniaturized, the antenna assembly may be much smaller (or even larger).

The antenna assembly 20 of the present invention provides an antenna gain to allow the RFID 18 to receive and transmit radiofrequency signals 16 from reader 17. A variety of different methods may be used to create the antenna pattern on substrate 22. For example, one method of creating the antenna pattern is through the use of a copper cladded foil that can be etched to create the antenna pattern shape. However, this process requires that a copper film material be first deposited onto the substrate 22 and a portion of the copper film material is etched to remove unwanted material, while leaving the desired antenna pattern. This is known as a subtractive process and is generally considered more expensive. In other methods of creating the antenna assembly 20, conductive ink or conductive paint may be used to create the pattern of lines. However, conductive paint tends to crack, has a need for relatively high conductive particle loading, and provides low resistivity. Such reasons dictate against the use of such materials in antenna assembly 20. While conductive inks are readily applicable to a substrate material and typically don't have the same drawbacks as a conductive paint, the costs of the conductive ink is the limiting factor. Moreover, for both conductive paint and conductive ink, the presence of silver material is a growing concern to environmentally-inclined private and governmental organizations.

One preferred method of creating the antenna assembly 20 on substrate 22 is through a physical deposition process called thermal evaporation (e.g., vacuum metallization). Vacuum metallization methods are able to create sub-micrometer depositions of high quality conductive material. The quality of the deposition is a function of various parameters (vacuum pressure, material, in-process controls, etc.) however the objective of using vacuum metallization is to provide a suitably dense metal layer that improves antenna performance. For example, while several microns of electroplated copper are presently used to achieve the desired electrical performance of an RFID tag, aluminum may also be used, however, in a thicker and/or denser amount. The advantage of aluminum over any other material, including copper, is the non-toxicity of aluminum to the human body and environment. Many metals (especially those characterized as heavy metals), can find themselves in the environment that humans also occupy as in, for instance, air and water supplies. When heavy metals get into the human body they become difficult or impossible to dislodge and cause serious disease. Lead is a good example but other metals such as nickel, silver, chrome, are of concern and generally higher regulated or soon will be highly regulated. In regard to aluminum, the reduced conductivity relative to copper, means that antenna performance would be less unless compensating factors are deployed. For instance, the aluminum deposited thickness would be different than that used for copper to provide the same level of bulk conductivity. Vapor deposited processes are tailored to also provide an adequate density of deposition. Electroplating aluminum is not common because of process limitations or the consequences of waster disposal.

In addition to thermal evaporation or vacuum metallization, a variety of other metallization methods may be used to deposit the antenna assembly 20 onto substrate 22. For example, sputtering, web-coating, electroless plating, or other additive methods may be used to apply the conductive pattern onto substrate 22. Additional aspects of the methods of applying antenna assembly 20 onto substrate 22 will be described in more detail below.

While not shown, the antenna assembly 20 may comprise a shape changing element that changes in response to some external factor. For example, the shape changing element may comprise a shape memory element or a piezoelectric element. The shape memory element may change/respond to differences in temperature, while the piezoelectric element would respond differently to different electrical signals. Such shape changing elements could provide for a change in shape of at least a portion of the antenna assembly so as to compensate for performance in adverse conditions or to provide unique performance for specific applications and for specific temperature ranges or electrical signals. For example, changing the shape of the antenna surface may affect the sensitivity of the antenna in a spatial sense; e.g., the sensitivity or gain of the antenna at various angles relative to the incident RF signal depends somewhat on the positioning of the antenna. Hence, modifications to the shape and orientation of the antenna may be useful in certain circumstances to affect enhanced performance.

RFID tags 18 may optionally include an element 26 that at least partially covers the RFIC 24. The element 26 may be used to at least partially protect he RFIC 26 from environmental factors such as mechanical abrasion, dirt, moisture, electromagnetic radiation (if the element 26 is at least partially conductive), and/or physical security (e.g., anti-tampering). In some configurations the element 26 will partially cover RFIC 24, and in other configurations, the element will fully encapsulate RFIC. 24.

Figure 3:
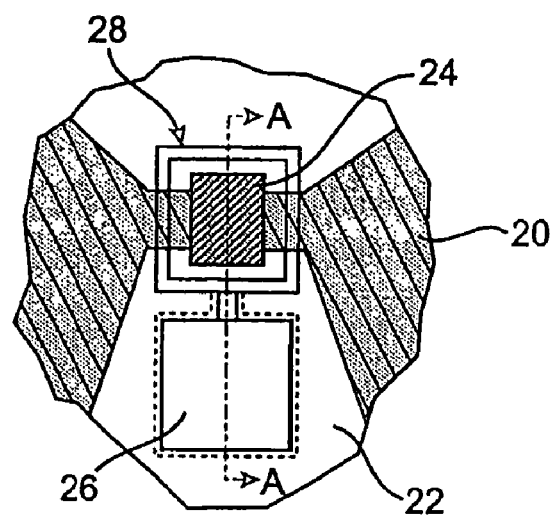
FIG. 3 is an expanded view of a central section of the RFID tag of FIG. 2 that shows a placement of a radiofrequency integrated circuit in electrical communication with a portion of the antenna assembly, wherein an optional lid structure and trough structure are formed in the substrate so as to fully encapsulate the radiofrequency integrated circuit.

Referring now to FIG. 3, in one embodiment, the element 26 is in the form of a lid that is integrally formed from and connected to substrate 22. In FIG. 3, the lid element 26 is die cut around its periphery so as to conform to a shape that will be sized to at least partially encapsulate RFIC 24. In such embodiments, the substrate 22 and a portion of the antenna assembly 20 may include a coupling assembly 28 that is used to couple the lid element to the substrate 22 around RFIC 24.

Figure 4:
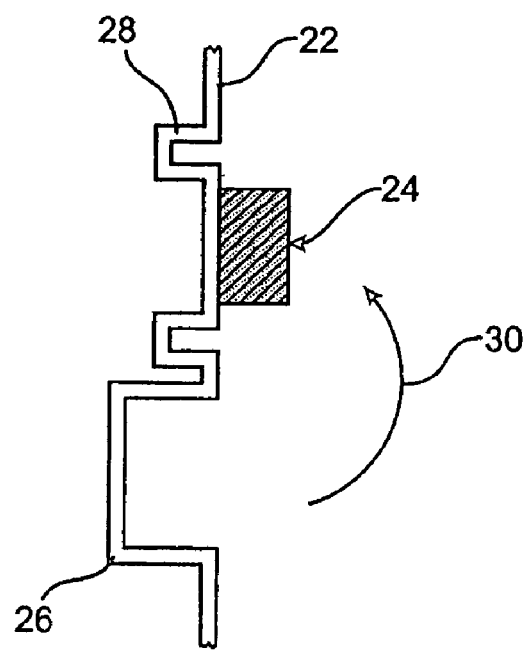
FIG. 4 is a cross-sectional view of the RFID tag of FIGS. 2 and 3 along A-A that illustrates the optional lid and trough structure integrally formed in the substrate.

While the coupling assembly may take many forms, in one exemplary embodiment, coupling assembly 28 is in the form of a trough that is formed from the substrate 22 in an area that surrounds the footprint of RFIC 24, such that the formed lid element 26 may be placed above the trough coupling assembly 28 and subjected to a closing force so as to complete a tight seal around a periphery of RFIC 24. The trough may be formed either before or after the metal antenna is applied through generally standard and well-accepted principles of thermoforming. FIG. 4 is a cross-sectional view of the trough coupling assembly 28 and the lid element 26 along lines A-A' in FIG. 3. As can be seen, lid element 26 is integrally formed from a shaped portion of the substrate 22 that is not part of the conductive antenna assembly 20. In order to at least partially cover or encapsulate RFIC 24, the lid may be folded over in the direction of arrow 30 so as to interact with the coupling assembly 28. In preferred embodiments, the lid element 26 forms a tight seal around a periphery of the RFIC 24 so as to fully encapsulate RFIC 24.

Figure 5:
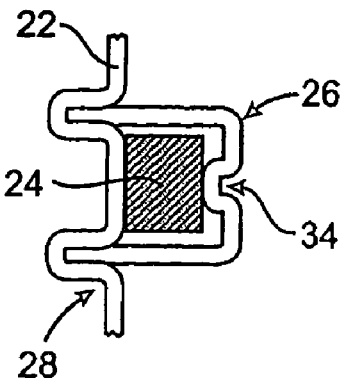
FIG. 5 is a cross section view of an alternative embodiment of a lid structure and a trough structure, in which the lid structure comprises a pressure creating feature.

Referring now to FIG. 5, in some embodiments, lid element 26 may not be integrally coupled to substrate. Lid element 26 of FIG. 26 may be formed of substrate 22 or it may comprise a different material, such as being in the form of a metal can, paper, ceramic, rubber, silicon, or the like. In one configuration, a free end 32 of lid element 26 may interact with coupling assembly 28 to attach lid element 26 to substrate 22. Ends 32 may be press-fit into a trough, attached to the substrate with an adhesive, or the like, so as to at least partially encapsulate RFIC 24.

Optionally, lid elements 26 of the present invention may include one or more features 34 that are configured to contact a portion of RFIC 24 to cause leads (not shown) of RFIC 24 to be compressed against leads (not shown) of antenna assembly 20. Suitable selection of lid element 26 material (e.g., in terms of stiffness or elastic modulus, thermoforming parameters, etc.) effect the compression force on the RFIC 24 from feature(s) 34. The compression force provided by lid element 26 and features 34 on lid element enables RFID tag 18 designs that do not require electrically conductive adhesives, although if desired such conductive adhesives could still be used. Through appropriate design, less expensive non conductive adhesives could be used in conjunction with the lid elements 26 to affect a wholly efficient mechanical and electrical design. For instance, this would be accomplished by using nonconductive adhesive around the perimeter of the RFIC/antenna contacting points. Moreover, such designs would allow the use of non-conductive adhesives that are used to simply hold the RFIC 24 in the appropriate location relative to the antenna leads.

Figure 6:
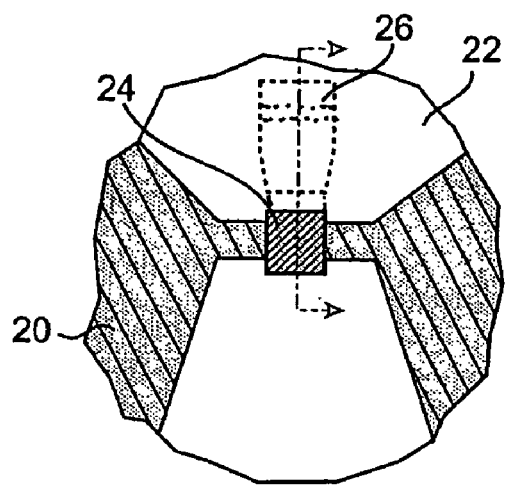
FIG. 6 is an expanded view of a central section of the RFID tag of FIG. 2 that shows a placement of a radiofrequency integrated circuit in electrical communication with a portion of the antenna assembly and an alternative embodiment of an optional lid structure.
Figure 7:
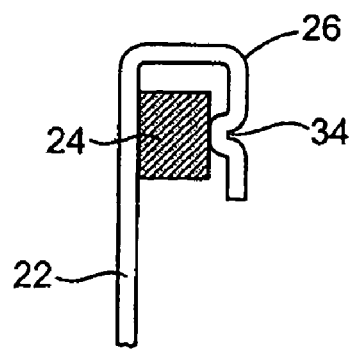
FIG. 7 is a cross sectional view along B-B which shows that the optional lid structure comprises at least one pressure creating feature and does not fully encapsulate the radiofrequency integrated circuit.

FIGS. 6 and 7 show a lid element 26 that is formed of substrate 22 and is merely bent over a portion of RFIC 24 so as to only partially cover RFIC 24. The illustrated lid element 26 may be shaped so as to be biased toward substrate 22 so that feature(s) 34 compress RFIC 24 leads against antenna leads (not shown).

In any of the embodiments described herein, lid elements 26 may be metallized on one or more surfaces, or otherwise made conductive so as to provide EMI shielding for the RFIC. Metallization may be created through a variety of methods, but is preferably carried out through vacuum metallization. Vacuum metallization has been found to provide a substantially even metal coating over the desired portions (both flat portions of lid element and creases in the lid element, so as to provide EMI shielding to RFIC 24. Grounding of the metal layer could be accomplished through an appropriate contact point on the RFIC or via external leads and sources (not shown). A more complete description of methods and devices that may be used to vacuum metallize a substrate can be found in commonly owned U.S. Pat. No. 5,811,050, the complete disclosure of which is incorporated herein by reference.

Figure 8:
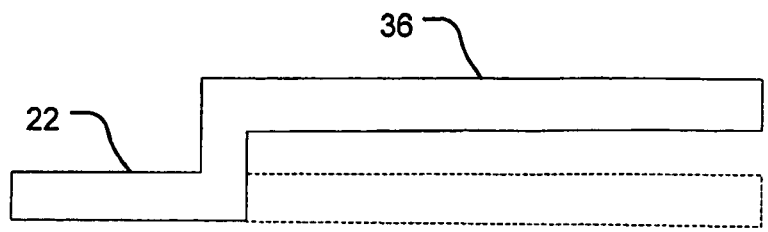
FIG. 8 is a cross sectional view of the antenna assembly along C-C in FIG. 2 which illustrates raised portions and recessed portions of the substrate.

Referring now to FIG. 8, substrate 22 may be modified to create a pattern that improves the creation of the antenna assembly 20. For example, as shown in FIG. 8, portions of substrate 22 may be raised 36 and/or recessed (not shown). In the embodiment of FIG. 8, raised portion 36 of substrate 22 may be in a pattern that corresponds to the desired shape of antenna assembly 20. During manufacturing, the entire desired portion of substrate 22 may be metallized, or only one of the raised/recessed portions may be metallized. If both the raised and recessed portions are metallized during manufacturing, the recessed may be processed using a suitable method mechanical "scrapping" or exposure to a solvent to remove the metal layer, so as to leave only a metal layer on the raised portion and provide the final shape of antenna assembly 20. As can be appreciated, in alternative embodiments, it may be desired to instead remove the metal layer from the raised portion and leave only the metal layer on the recessed portion.

Antenna assembly 20 may be formed on substrate 22 using any of the methods described herein, and some or all of the substrate 22 that is not used to form the antenna assembly 20 and/or lid element 26 may be removed through die cutting or other equivalent processes to remove the excess substrate material 22. For example, as shown in FIG. 2 a portion of substrate 22 may be left around a perimeter of antenna assembly 20 and lid element 26, if desired.

Figure 9:
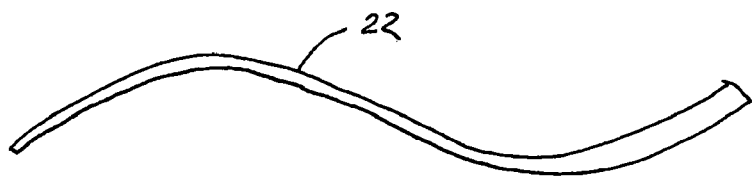
FIG. 9 is a cross sectional view of a strengthening structural feature of the substrate.

As shown in FIG. 9, RFID tag 18 may optionally be strengthened mechanically by creating a structural feature 38 in the substrate 22, before or after the forming of the antenna assembly 20 on substrate 22. For example, as shown in FIG. 9, the substrate 22 (shown edgewise) may be processed to have a sinusoidal or wave like shape so as to provide a stiffening effect on the overall structure. The "wave" shown for substrate 22 is merely illustrative that the out-of-plane shape does not have to be regular (e.g., flat) and that the inherent flexibility and shapeability of the substrate film can be used to provide antenna tags that are both conformal (in the sense that they are attached to another object) or enhanced (in the sense that certain geometric configurations may increase antenna gain).

Figure 10A:
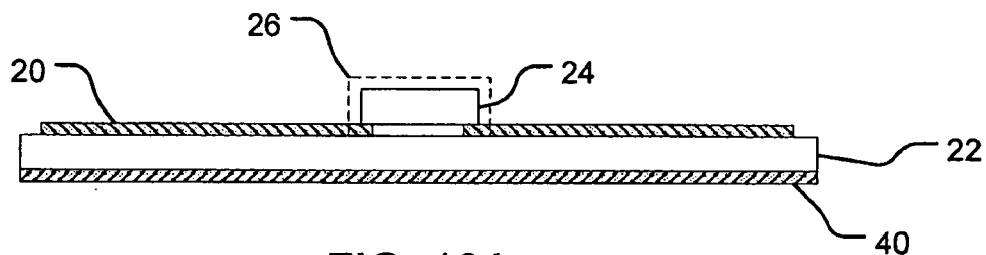
FIG. 10A illustrates a simplified RFID tag encompassed by the present invention that comprises a shielding layer on a second surface of the substrate.

FIG. 10A illustrates another RFID tag 18 encompassed by the present invention. RFID tag 18 comprises a substrate 22 comprising a first side and a second side and any of the antenna assemblies 20 described herein will be coupled or otherwise formed on the first side of substrate 22. RFID tag 18 may comprise a lid element 26 (shown in dotted lines) that at least partially encapsulates, compresses, and/or EMI shields the RFIC 24. In other embodiments, RFID tag 18 will not have a lid element 26 and leads of RFIC 24 may be coupled to leads of antenna assembly 20 through conventional means (e.g., conductive adhesive, solder, or the like). The second side of substrate 22 may have an EMI shield 40 in the form of a grounded conductive layer. EMI shield 40 may be formed on substrate using any of the methods described herein (e.g., vacuum metallization, electroless deposition, sputtering, or the like). EMI shield 40 will typically have a thickness between about 1 micron and about 5 microns and will be made of any of the metal materials described herein, so as to be sufficient to block EMI from the RFIC 24. Grounding may be either via a connection to the RFIC or through other external means including but not limited to an external circuit designed to handle the conductance of electrical energy.

Figure 10B:
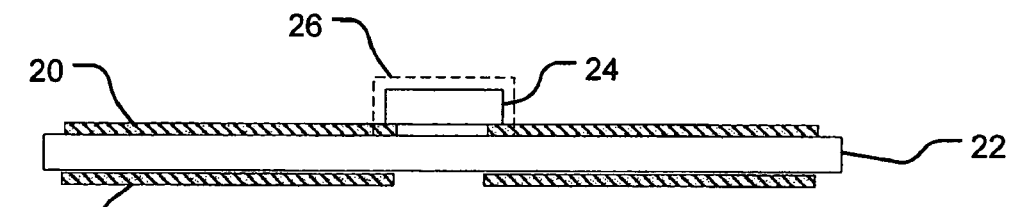
FIG. 10B illustrates a simplified RFID tag encompassed by the present invention that comprises a second antenna assembly coupled to a second surface of the substrate.

FIG. 10B illustrates a further embodiment of an RFID tag encompassed by the present invention in which first and second antenna assemblies 20, 20' are coupled to both a first side and a second side of the substrate 22. Both the first and second antenna assemblies 20, 20' will be in electrical communication with leads of RFIC 24. The second antenna assembly 20' may be of a different shape or it may be of the same shape as the first antenna assembly. In advanced versions of the RFID tag, the ability to transmit/receive of various channels or frequencies may be useful either for pure communications purposes or to differentiate between two signals such as may be used in a sensor.

Figure 11:
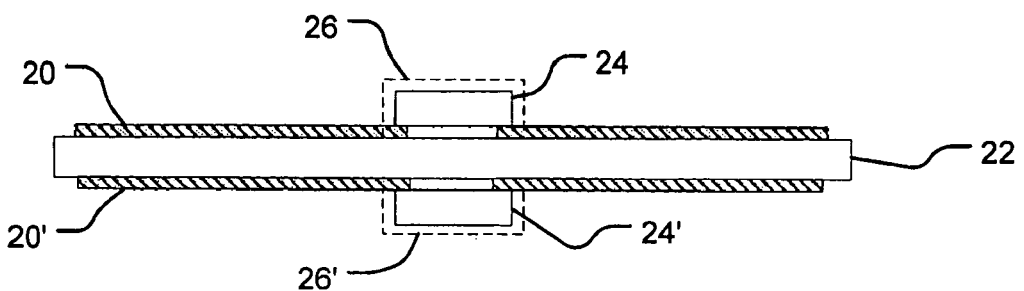
FIG. 11 illustrates a simplified RFID tag encompassed by the present invention that comprises a second antenna on a second surface of the substrate and an optional second radiofrequency integrated circuit.

FIG. 11 illustrates another embodiment of an RFID tag 18 encompassed by the present invention. RFID tag 18 comprises a substrate having a first side and a second side. The first side will have a first antenna assembly 20 in electrical communication with leads of a first RFIC 24. Optionally, any of the lid elements 26 described herein may be used to at least partially encapsulate, compress, and/or EMI shield RFIC 24. The second side will have a second antenna assembly 20' in electrical communication with leads of a second RFIC 24'. Any of the lid elements 26' described herein may be used to at least partially encapsulates, compresses, and/or EMI shields RFIC 24'. Similar to above, lid elements 26, 26' may be metallized or otherwise made conductive so as to provide partial or full EMI shielding to RFICs 24, 24'. Essentially, two independent RFID tags may be provided on a single substrate. However, if desired, there may be communications between the two RFICs 24. In such a manner, independent systems may provide an element of increased robustness (in case on element becomes inoperable).

While not shown in FIG. 11, it may be possible to mount RFIC 24' on the second side of substrate 22 and not have the second antenna assembly 20'. In such embodiments, leads of the RFIC 24' may be coupled to first antenna assembly 20 through vias (not shown) in substrate. It is also possible to connect each side to the other through the use of vias that have been metallized so as to provide an electrically conductive path between the antenna assemblies 20, 20'. The interconnectivity of the two RFID antenna tags would enable more elaborate schemes for the processing of information.

Furthermore, while the substrates 22 of the present invention are shown as a single layer substrate, it should be appreciated, that the substrates 22 of the present invention may be comprised of a plurality of layers. As such, it may be possible to place a conductive or metal layer in between a first substrate layer and a second substrate layer to provide EMI shielding to RFIC 24. Thus, for the embodiment of FIG. 11, it may be possible to provide an EMI shield in between the first RFIC 24 and the second RFIC 24'.

Figure 12:
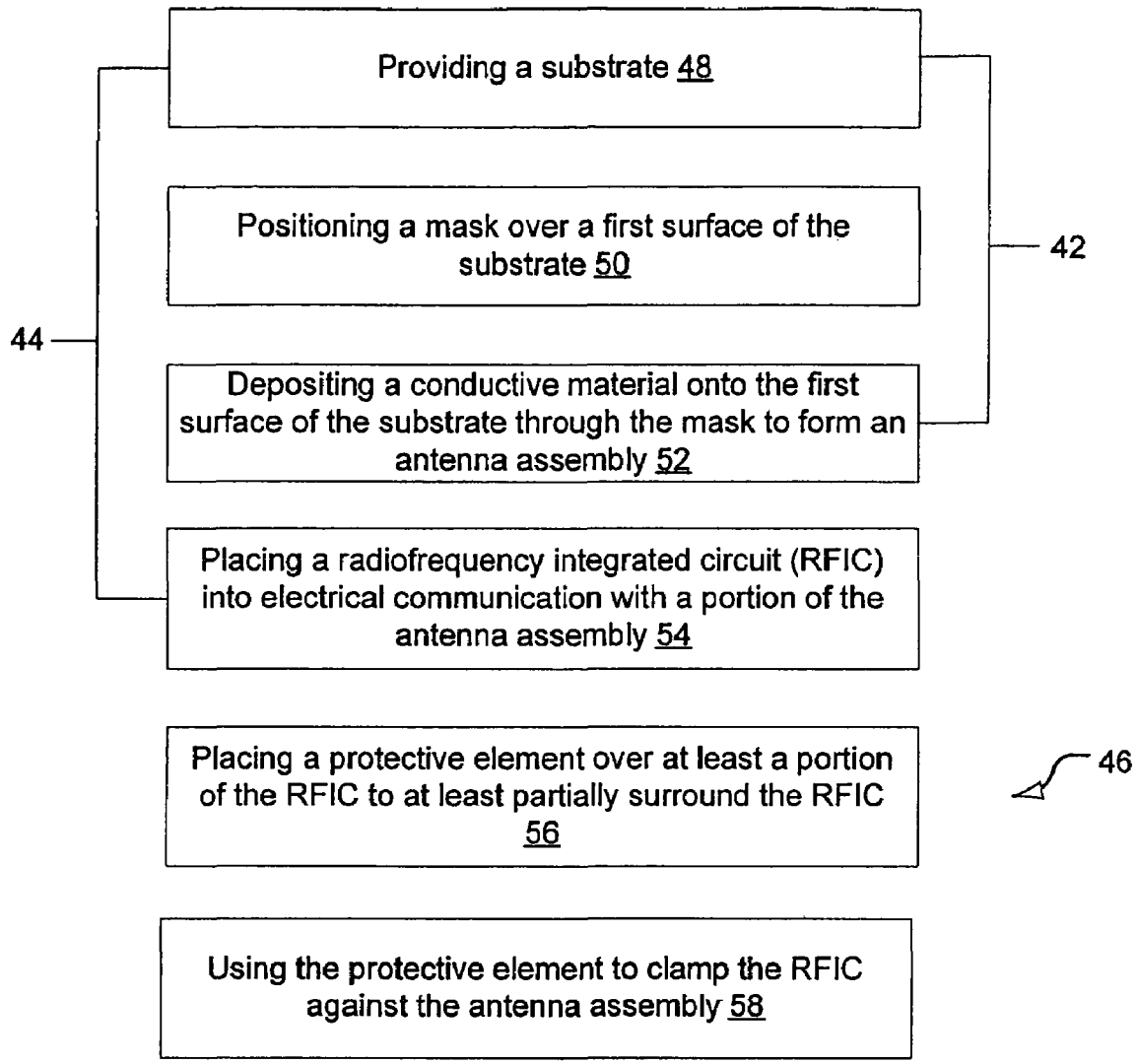
FIG. 12 is a flowchart that illustrates a simplified method of fabricating an RFID antenna assembly and RFID tag.

FIG. 12 schematically illustrates one simplified method of manufacturing an RFID tag 18 of the present invention. As can be appreciated, the method shown in FIG. 12 is merely illustrative, and other methods may be used to manufacture the RFID tags 18 of the present invention. The methods of the present invention generally first include forming an antenna assembly on a substrate 42. Once the antenna assembly is formed on the substrate, a passive (or active) RFIC 24 may be applied across and in contact with one or more features of the antenna assembly to form the RFID tag 18. If desired, EMI shielding may thereafter be applied to shield the RFIC 24 (Step 46).

As shown in FIG. 12, a single layer or multi-layer substrate is provided (Step 48) and a mask may be positioned over a first surface of the substrate (Step 50). A conductive material is deposited onto the first surface of the substrate through the mask to form an antenna assembly on the first surface of the substrate (Step 52).

Once the antenna assembly is formed, leads of an RFIC are placed into electrical communication with a lead portion of the antenna assembly (Step 54). RFIC may be coupled to leads of the antenna assembly using any known method (e.g., conductive adhesive, non-conductive adhesive, etc.). However, in order to improve the functionality of RFID tag 18 and to reduce costs by foregoing the need for a conductive adhesive, a protective lid element may be placed over at least a portion of the RFIC to partially surround the RFIC and to clamp the RFIC against the antenna assembly with a compressive force (Steps 56 and 58). The compressive force maintains a contact between leads of the RFIC and leads of antenna assembly 20, without requiring the need of an expensive conductive adhesive. If desired, a non-conductive adhesive may be used around a periphery of RFIC 24 to couple the RFIC 24 to the substrate 22 and/or antenna assembly 20.

Optionally, it may be desirable to form an EMI shield on a second side of the substrate (see FIG. 10). While not shown in FIG. 12, it is also possible to form a second antenna assembly on a second side of the substrate and placing a second RFIC into electrical communication with the antenna assembly, using the same steps described in FIG. 12. Alternatively, it may also be desirable to position an EMI shield on the second side of the substrate (see FIG. 10A).

Figure 13:
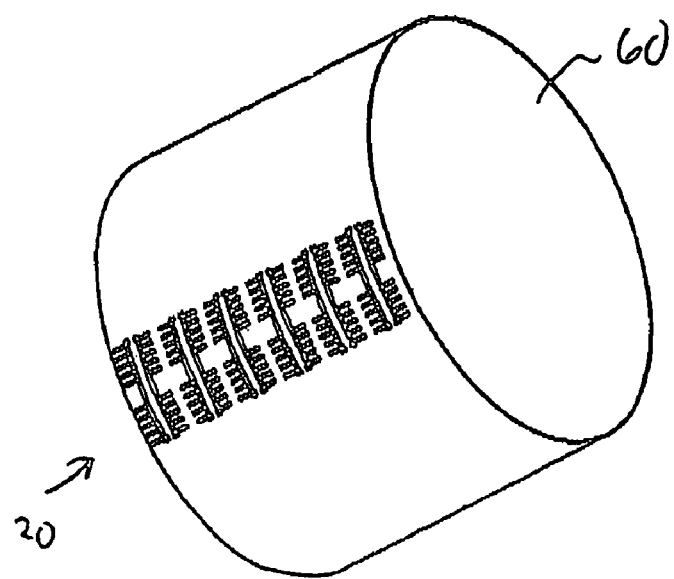
FIG. 13 shows one example of a masking cliché that may be used to form a conductive antenna pattern on the substrate.

FIG. 13 illustrates one mask 60 that may be used with the methods of the present invention to form the antenna assembly 20 on substrate 22. In some methods, the mask is in the form of a masking cliché, similar to clichés used for silk-screening, pad printing or solder past application. In such methods, a roll or sheet of polymer substrate 22 may be applied over an outer surface of the masking cliché 60. In such methods, the polymer substrate 22 and cliché may be placed in a vacuum metallization chamber in such a manner where a variety of different conductive materials (e.g., aluminum, copper, nickel, tin, silver gold, and other similar metals or alloys) may be applied through patterned openings in the masking cliché and onto the polymer substrate 22. Once metallized, the polymer substrate 22 may be removed from the cliché to reveal an antenna pattern of a desired shape and thickness formed on the polymer substrate. 22.

As noted above, the present invention is not limited to vacuum metallization and other methods, such as sputtering, electroless plating, and the like may be used to apply the metal layer onto polymer substrate 22. Masking clichés would be useful when the processes involve the direct impingement of vapor (such as with sputtering or vacuum metallization). Electroless plating (as well as electroplating) are general broad area means of providing a coating and would be less amenable to the use of masks though they could still be developed.

In addition to a pattern for an antenna, it may also be possible to have a pattern for the metallization of the lid element 26 in the masking cliché. While, this kind of dual metallization is more sophisticated in terms of mask design, such a pattern is still possible in metallization systems that feature internal moving tools that allow the film to be exposed to the impinging vapor coating at various angles (such as for thermal vaporization). Consequently, the EMI shield and antenna pattern may be formed in a single metallization step. Moreover, it may also be possible to have a second masking cliché that is used to form the EMI shielding layer on the second/opposite side of the polymer substrate. Metallizing both sides of a substrate is possible with appropriate tool and equipment design as exemplified by the use rotating assemblies in large (round) batch processing vacuum chambers.

Masking clichés 60 may be fabricated to appropriate mask and create a few hundred to several thousand antenna patterns in a single metallization cycle on the roll of polymer substrate. While a preferred masking cliché 60 is formed of a thin sheet-metal such as tin, steel, aluminum copper, or their alloys, other materials (either conductive or dielectric) may be used to form masking cliché 60. The antenna pattern formed in masking cliché 60 may take any desired form. In one particularly useful pattern, the antenna pattern has a width of 0.5 inches and a length of 3.0 inches. However, as the various needs for the RFID tags 18 develop, the dimensions and details of the antenna pattern may be much larger or smaller In an alternative embodiment, mask 60 may be in the form of a removable polymer masking layer that is attachable to one surface of polymer substrate. In such embodiments, the masking layer will have one or more antenna patterns formed in the layer by removing material that is in the shape of the desired antenna pattern, so as to expose the underlying polymer substrate to be metallized. The masking polymer layer and underlying polymer substrate may then be metallized using any of the metallization methods described herein. Once metallized, the masking layer may be removed, thus leaving only the desired metallized antenna pattern. The masking layer 60 may be formed of any suitable polymer material, but will typically comprise polyethylene, polycarbonate, PVC, PET, PETG, ABS, PC/ABS or similar materials.

One advantage of such an approach is that the antenna masking may accompany the substrate through the process in a roll-to-roll process. Thus, once formed, the mask (the thin polymer pre-cut film) is placed in intimate contact and held with the substrate so as to form an ostensibly single unit for processing. After metallization, the pre-cut mask film is removed to expose the metal antenna pattern on the substrate. The pre-cut film that now is covered with metal coating may be recycled and re-extruded to make other useful products requiring a conductive quality.

Figure 14A:
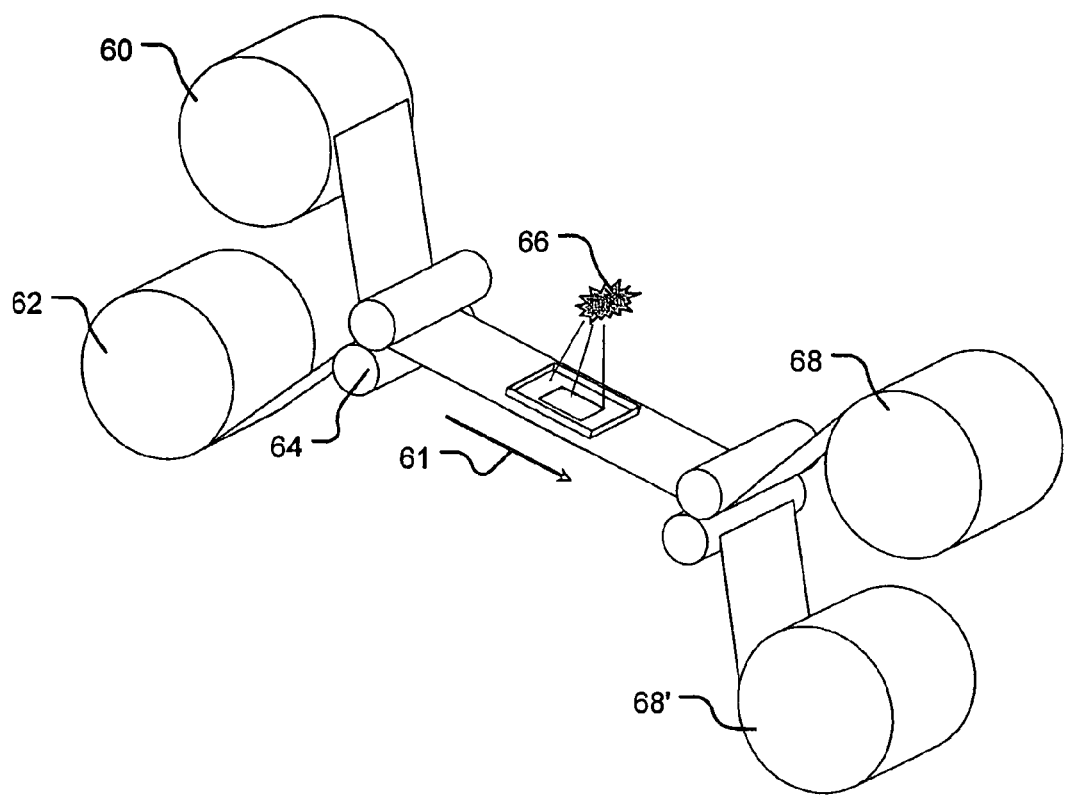
FIG. 14A schematically illustrates an in-line process of forming an antenna assembly on a roll of substrate.
Figure 14B:
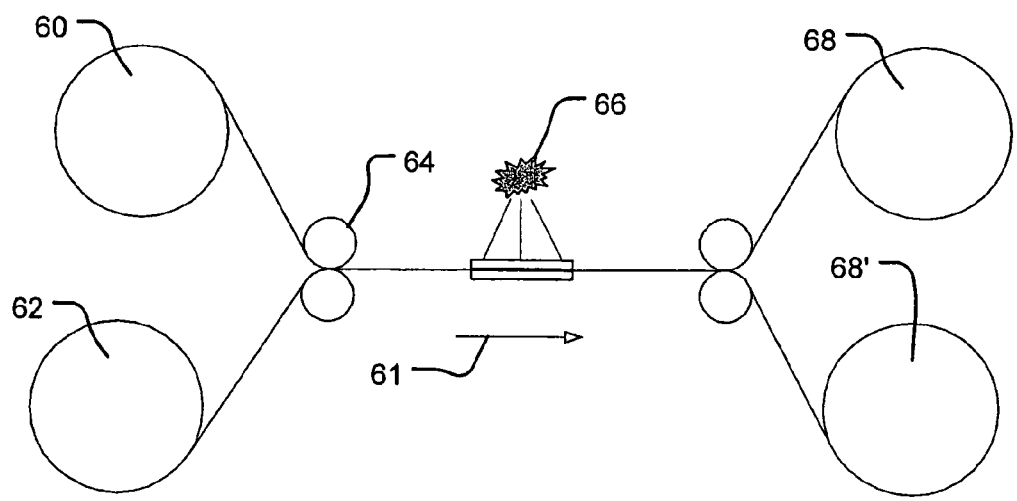
FIG. 14B is a side view of the in-line process of FIG. 14A.

In one specific embodiment shown in FIGS. 14A and 14B, the methods of the present invention represents an improved process because the input to the process is contained on two reels (one reel for substrate 62 and one reel for the masking film 60). Initially, the masking film 60 is cut to cause the antenna assembly shape to become apparent in the film. Subsequently, both films (substrate and masking) are moved together (in the direction of arrow 61 and held under pressure (with a series of pressure rollers 64) while the metallization process occurs with a metal deposition source 66. Thereafter, the two film strips 60, 62 are collected on independent drums/rollers/reels 68, 68' representing the final result of the process. By deploying in-line equipment for the film strip (which may be less than 4 inches wide), the entire process can be automated for high speed production.

Figure 15:
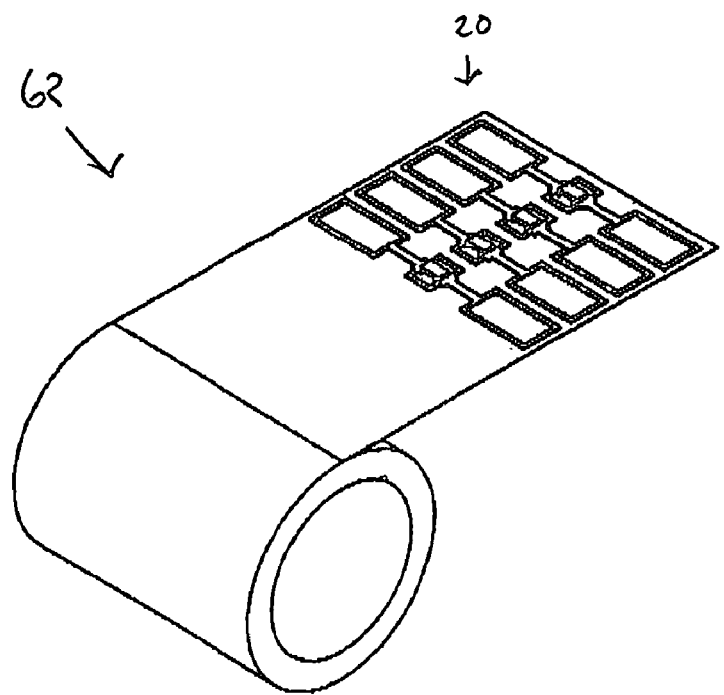
FIG. 15 shows an example of a roll of the substrate with a plurality of antenna patterns and radiofrequency integrated circuits attached.

FIG. 15 shows one embodiment of a roll 62 of polymer substrate with a plurality of antenna assemblies 20 formed thereon and RFIC 24 coupled to the antenna assembly. The roll of substrate 62 may be rolled up after formation of antenna assemblies 20 and transferred to a processing station (either on the same site or at a different site) to apply the RFIC 24, form the mount lid element 26, and cut out each antenna assembly 20 to create the individual RFID tags 18, or the like. Because the antenna assemblies 20 are on a roll, it may be possible to attach RFIC 24, form the lid element, cut the lid element, and the like, in an in-line process.

It is understood that the examples and embodiments described herein are for illustrative purposes only and that various modifications or changes in light thereof will be suggested to persons skilled in the art and are to be included within the spirit and purview of this application and scope of the appended claims. For example, while not shown herein, a person of ordinary skill in the art will recognize that the methods of the present invention are equally applicable to active RFID tags. In such embodiments, the same antenna assembly 20 of the present invention may be used, and the primary difference in the chip will be the inclusion of a power source (e.g., battery) and related circuitry.

In further uses of the RFID tags of the present invention, the RFID tags may be coupled to a surface of an integrated circuit or a printed circuit board, either via direct deposition or by the use of another thin substrate. Such an approach may allow for the tracking of the integrated circuit/printed circuit board, but it also may provide additional functionality for communication with internal circuitry of the integrated circuit. In practice, the RFID tag would be attached mechanically and existing semiconductor manufacturing processes used to create an electrically conductive lead from the board to the tag.

While the above description focuses on methods of manufacturing an antenna assembly for an RFID tag, it should be appreciated, that the methods and devices of the present invention are not limited to antenna assemblies for RFID tags and the methods may be used to form a variety of different conductive structure on a substrate. For example, the methods of the present invention may be used to manufacture an antenna assembly for other RF-based devices, such as RF antenna for WiFi, cellular, or the like.

What is claimed is:

1. A method of manufacturing a radiofrequency identification tag (RFID) or a portion thereof, the method comprising:
    applying a conductive antenna onto a substrate;
    positioning a radiofrequency integrated circuit over a portion of the conductive antenna; and
    placing a protective element over the radiofrequency integrated circuit to at least partially surround the radiofrequency integrated circuit,
    wherein placing the protective element clamps the radiofrequency integrated circuit against the conductive antenna with a compressive force; and
    wherein the compressive force maintains a contact between leads of the radiofrequency integrated circuit and leads of the conductive antenna.

2. The method of claim 1 wherein the radiofrequency integrated circuit is coupled to the conductive antenna without the use of a conductive adhesive.

3. The method of claim 1 wherein the protective element encapsulates the radiofrequency integrated circuit.

4. The method of claim 1 wherein placing the protective element over the radiofrequency integrated circuit comprises interacting the protective element with a locking assembly on the substrate.

5. The method of claim 4 wherein the locking assembly comprises a trough in the substrate that is around a periphery of the radiofrequency integrated circuit that is configured to receive and substantially maintain a position of at least a portion of the protective element.

6. The method of claim 4 wherein the locking assembly and protective element are at least partially conductive.

7. The method of claim 1 comprising forming the protective element from the substrate.

8. The method of claim 7 wherein the protective element is integrally attached to the substrate.

9. The method of claim 1 wherein the protective element comprises one or more pressure features that contacts the radiofrequency integrated circuit so as to cause the radiofrequency integrated circuit to compress against the antenna.

10. The method of claim 1 comprising forming raised and recessed portions on the substrate, wherein the antenna is formed on one or more of the raised and recessed portions of the substrate.

11. The method of claim 1 comprising providing strengthening structural features on the substrate.

12. The method of claim 1 comprising providing an electromagnetic interference shielding layer coupled to a second surface of the substrate.

13. The method of claim 1 comprising applying a dielectric layer over the conductive antenna.

14. The method of claim 1 comprising forming a second conductive antenna onto a second surface of the substrate.

15. The method of claim 14 wherein the second conductive antenna is in electrical contact with the radiofrequency integrated circuit or the second conductive antenna is in electrical contact with a second radiofrequency integrated circuit disposed on the second surface of the substrate.

16. The method of claim 1 wherein the substrate is substantially planar.

17. The method of claim 1 wherein the substrate is substantially cylindrical.

18. The method of claim 1 comprising coupling the conductive antenna to a shape changing element that comprises a shape memory element or a piezoelectric element.

19. A method of fabricating an antenna assembly or a portion thereof, the method comprising:
    providing a substrate;
    placing a mask over a first surface of the substrate;
    depositing a conductive material onto the substrate through the mask to form an antenna pattern on the substrate;
    positioning a radiofrequency integrated circuit into electrical communication with the antenna pattern; and clamping the radiofrequency integrated circuit onto the antenna pattern with a compressive force and with a structure positioned over at least a portion of the radiofrequency integrated circuit; and wherein the compressive force maintains a contact between leads of the radiofrequency integrated circuit and leads of the conductive antenna.

20. The method of claim 19 wherein the mask comprises a patterned masking cliché.

21. The method of claim 19 wherein the mask comprises a removable masking layer that comprises one or more antenna patterns removed from the masking material so as to expose a desired portion of the substrate.

22. The method of claim 19 wherein depositing the conductive material is carried out through vacuum metallization.

23. The method of claim 19 wherein depositing the conductive material is carried out through sputtering, web-coating, electroless plating, or thermal vapor deposition.

24. The method of claim 19 comprising forming raised and recessed portions on the substrate, wherein depositing the conductive material is carried out by depositing the conductive material on only one of the raised and recessed portions.

25. The method of claim 19 comprising providing strengthening structures to the substrate.

26. The method of claim 19 comprising coupling an electromagnetic interference shield to a second surface of the substrate.

27. The method of claim 19 comprising depositing a dielectric layer over portions of the antenna assembly that are not configured to contact a radiofrequency integrated circuit.

28. The method of claim 19 comprising:

placing a mask over a second surface of the substrate; and depositing conductive material onto the second surface of the substrate through the mask to form a second antenna pattern on the second surface of the substrate.

* * * * *